July 17, 1951　　　　F. A. GROTH　　　　2,561,021
APPARATUS FOR INJECTION MOLDING
Filed March 7, 1950　　　　　　　　　　4 Sheets-Sheet 1
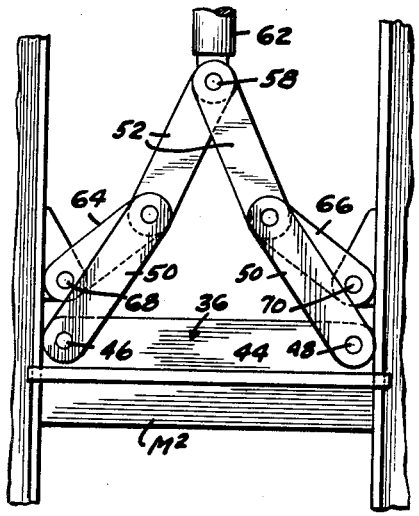
Fig. 2.
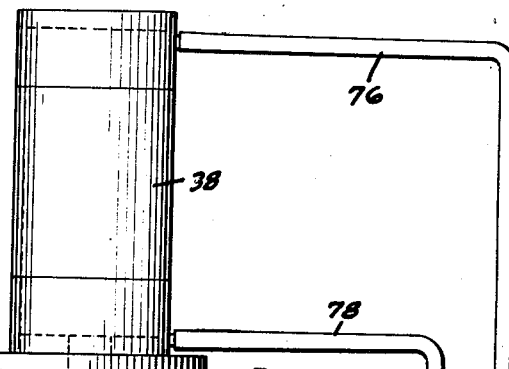
Fig. 1.
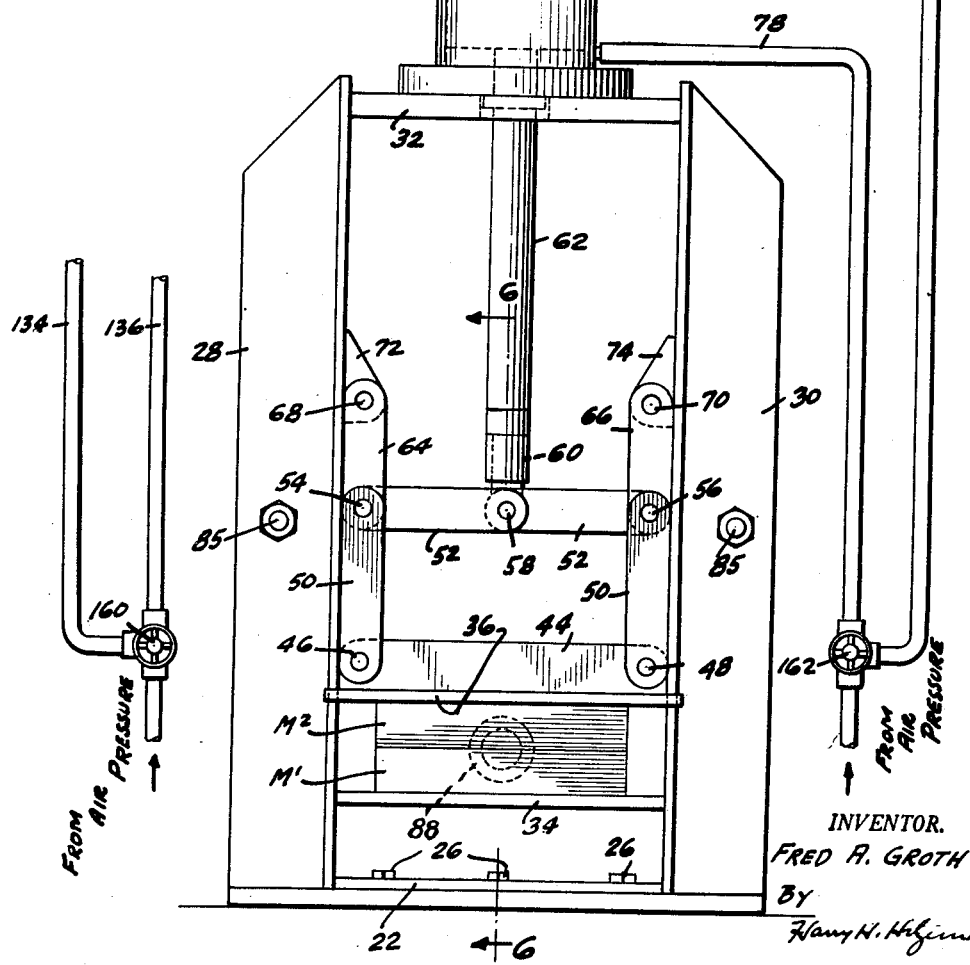
INVENTOR.
FRED A. GROTH
By
Harry H. Hilgeman
ATTORNEY.

July 17, 1951  F. A. GROTH  2,561,021
APPARATUS FOR INJECTION MOLDING
Filed March 7, 1950  4 Sheets-Sheet 2
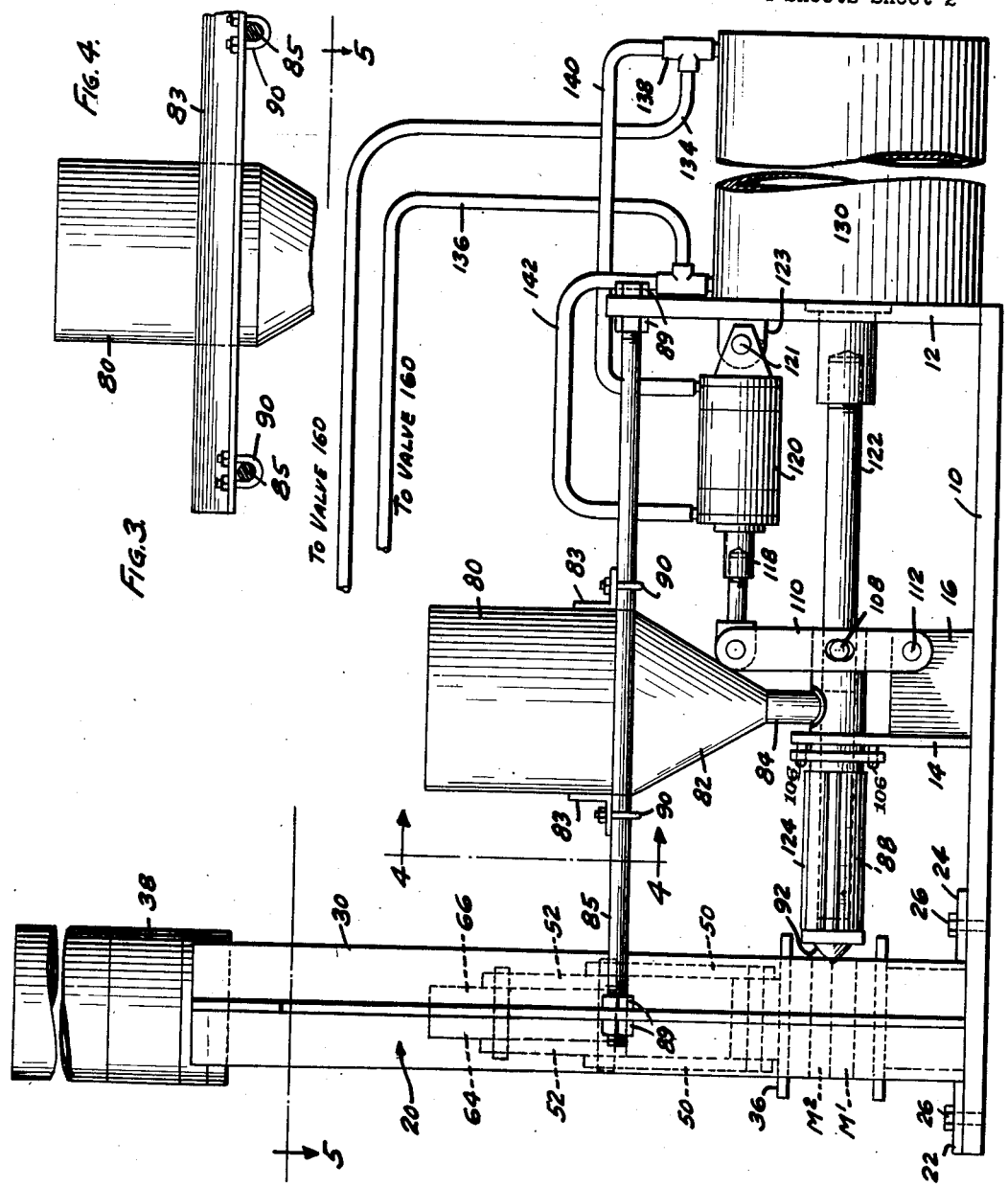
INVENTOR.
FRED A. GROTH
BY
Harry H. Hitzeman
ATTORNEY.

July 17, 1951  F. A. GROTH  2,561,021
APPARATUS FOR INJECTION MOLDING
Filed March 7, 1950  4 Sheets-Sheet 3
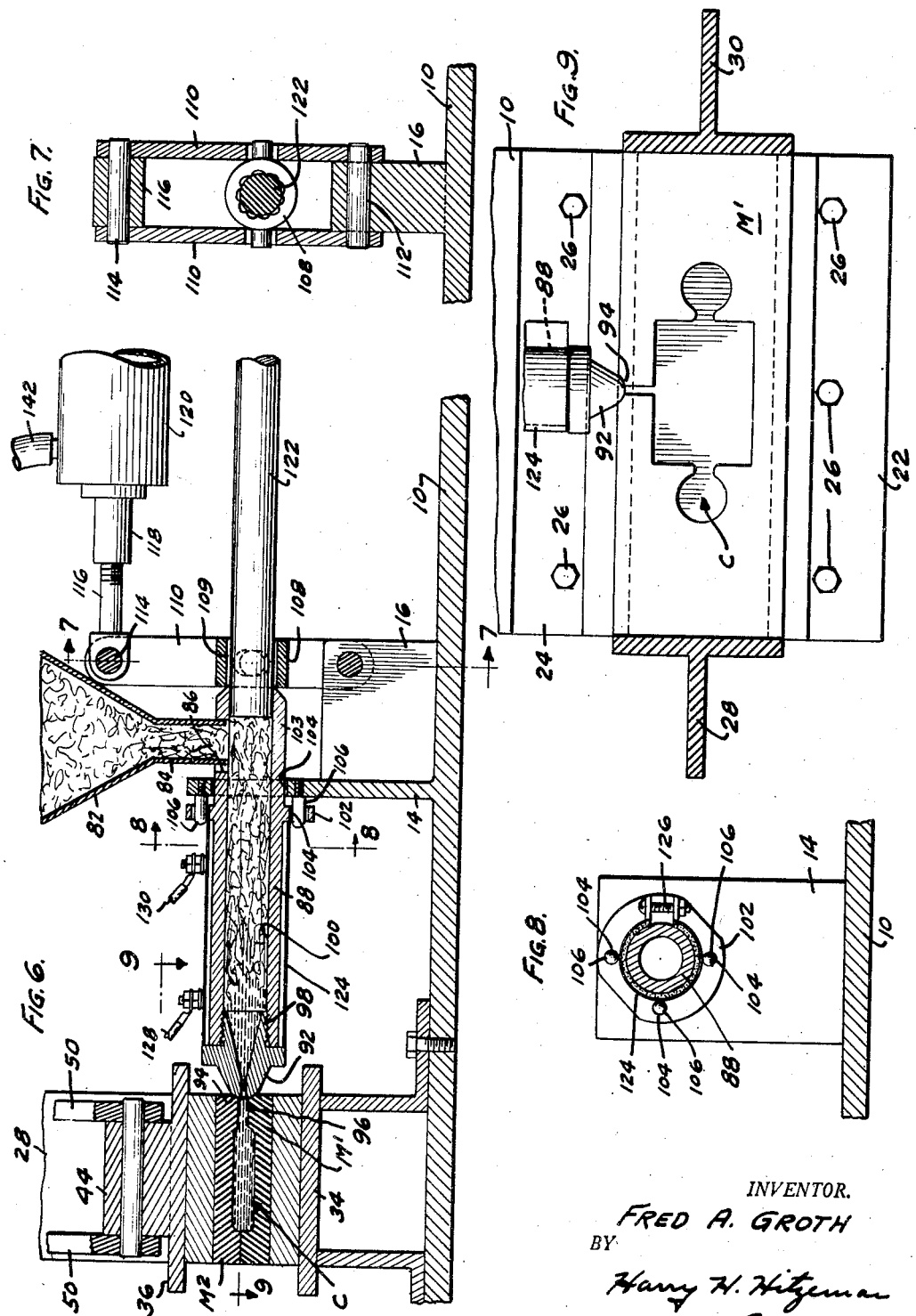
INVENTOR.
FRED A. GROTH
BY Harry H. Hitzeman
ATTORNEY.

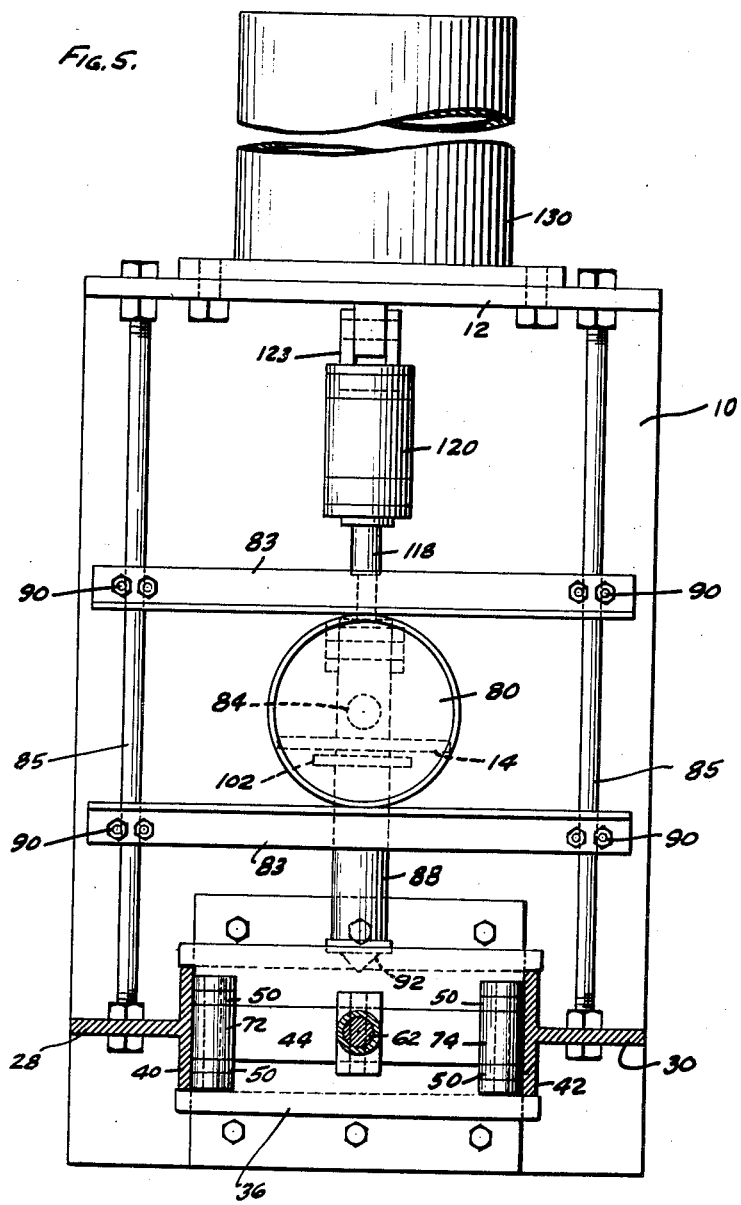

Patented July 17, 1951

2,561,021

UNITED STATES PATENT OFFICE 2,561,021

APPARATUS FOR INJECTION MOLDING

Fred A. Groth, Chicago, Ill., assignor to himself and Stanley M. Whitehill, both of Chicago, Ill.

Application March 7, 1950, Serial No. 148,025

6 Claims. (Cl. 18—30)

My invention relates to a new and improved apparatus for plastic injection molding.

An object of the invention is to provide an improved apparatus for carrying out plastic injection molding of the type described.

A further object of the invention is to provide an apparatus of the type described that is comparatively simple in construction and operation so that plastic injection molding may be done by the process referred to and with the apparatus herein to be described by ordinary or unskilled workmen, yet the articles produced thereby will be of the finest type and highest quality obtainable.

A further object of the invention is to provide apparatus of the type described which includes a comparatively small and movable injection cylinder, having a nozzle thereon which moves forward and forms a seal with the molds during the time that the molten plastic is being forced forward through the injection cylinder nozzle.

A further object of the invention is to provide a comparatively simple apparatus of the type described which includes air operated cylinders for locking the mold sections together, moving the injection cylinder forward and operating the injection cylinder piston in sequence so that the process is efficient and expeditious and each injection produces a molded object.

Other objects and advantages will be more apparent from the following description wherein reference is had to the accompanying drawings, upon which Fig. 1 is a front elevational view of my improved plastic injection molding apparatus;

Fig. 2 is a fragmentary front elevational view of the toggle link construction for sealing the molds, shown in a partially raised condition;

Fig. 3 is a side elevational view of the apparatus taken from the right side of Fig. 1;

Fig. 4 is a fragmentary sectional view showing the manner in which the plastic granules hopper is mounted upon the machine, and is taken on the line 4—4 of Fig. 3;

Fig. 5 is a plan sectional view of my improved apparatus taken generally on the line 5—5 of Fig. 3;

Fig. 6 is a fragmentary cross-sectional view through the movable injection cylinder base and associated parts, taken generally on the line 6—6 of Fig. 1;

Fig. 7 is a fragmentary cross-sectional view of the injection cylinder actuating mechanism taken generally on the line 7—7 of Fig. 6;

Fig. 8 is a fragmentary sectional view through the movable injection cylinder heater and associated parts taken generally on the line 8—8 of Fig. 6; and Fig. 9 is a plan sectional view through a mold, mold support base and associated parts, taken generally on the line 9—9 of Fig. 6.

In the embodiment of the invention which I have chosen to illustrate and describe the same, I have shown an injection molding apparatus for comparatively small parts, although the principle embodied therein is capable of incorporation into larger apparatus and apparatus capable of molding larger and more voluminous objects than those portrayed herein.

The mechanism preferably may include a base member 10 which has an upright rearward wall 12 and a medially disposed vertical wall member 14 with a transverse flange 16 extending rearwardly therefrom. A toggle frame unit 20 may be mounted upon the forward end of the base 10, the unit being preferably fabricated from steel structural members and including a pair of feet members 22 and 24 by which the same may be fastened to the base 12 by suitable set screw members 26.

The toggle frame member may include a pair of T members 28 and 30 having their tops facing each other and mounted upon its base in vertical parallel alignment. The T members 28 and 30 are connected together across the top by means of a horizontal brace member 32 and provided adjacent their lower ends with a horizontally disposed table member 34 upon which the lower mold section $M^1$ may be mounted, the upper section $M^2$ being suitably connected to the movable platen 36. The platen 36 and upper mold portion $M^2$ are adapted to be moved up and down by an air cylinder mechanism 38, the parallel wall portions 40 and 42 of the T members 28 and 30 serving as guides for the platen 36.

The platen has a bracket portion 44 having openings to receive a pair of pin members 46 and 48. Each of the pin members 46 and 48 have a pair of upwardly extending links 50 connected thereto, each pair of links 50 in turn being connected to a pair of links 52 about the pivot pins 54 and 56, the links 52 being pivotally connected at their ends to a pin 58 carried by a connector member 60 which is fastened in the end of the locking cylinder piston 62. The links 52 are also connected on the pin members 54 and 56 to pairs of link members 64 and 66 pivoted upon pin members 68 and 70 carried by lugs 72 and 74 upon the inner walls of the vertical T members 28 and 30.

With the linkage shown in Figs. 1 and 2, when air is introduced into the upper end of the cylinder 38 through the conduit 76, the piston therein will be forced downwardly and the piston rod 62 through the linkage shown will press the upper platen 36 and upper mold section M² in sealed position against the stationary mold section M¹ on the table 34. When air is introduced through the conduit 78 to the lower end of the air cylinder 38 below the piston therein, the piston will be moved to the upper end of the cylinder and the upper platen, through the linkage shown, will be drawn up to the position shown in Fig. 2.

Granules of plastic to be used in a molding operation may be deposited in the hopper 80 provided as shown, with a conically shaped discharge section 82 terminating in a reduced cylindrical portion 84 that extends into an elongated opening 86 in the upper wall of the injection cylinder 88. The hopper 80 may be suitably mounted by means of a pair of angle members 83 welded to the sides of the same upon a pair of horizontally disposed rod members 85 which extend from the back wall 12 of the base 10 through suitable openings in the legs of the T members 28 and 30. Lock nut members 89 mount the rod members 85 in position. The angle members 83 may have suitable U-bolts 90 for fastening the hopper rigidly to the rod members 85 in a desired position.

The injection cylinder 88, as previously explained, is adapted to be moved forward so that the nozzle 92 having the rounded face 94 may engage the complementary bore 96 in the mold portions to permit the flow of fluid plastic into the cavity C in the mold. The nozzle has a reduced screw-threaded portion 98 adapted to be screw-threadedly mounted in the end of the bore 100 in the injection cylinder 88. The cylinder also has a lateral flange 102 provided with a plurality of openings 104 within which guide pins 106 may operate, the guide pins 106 being mounted in the vertical wall 14 of the base 10. The cylinder 88 has a portion 103 which extends through an opening 104 in the vertical wall 14 and abuts against a cylinder lock yoke member 108 which is carried by a pair of vertically disposed link members 110 pivoted at their lower ends upon a pin member 12 mounted in the portion 16 of the base 10. The upper ends of the links 110 are connected by a pin member 114 to a yoke 116 connected to the end of the piston rod 118 that reciprocates in the piston 120. The cylinder lock yoke 108 has an axial opening 109 to telescopically receive the injection piston 122, the opening being sufficient so that in the limited movement through which the lock yoke operates there will be sufficient clearance for oscillatory movement of the injection piston 122.

I provide heating means for the injection cylinder 88 which may comprise an electric heating unit 124 fastened about a cylinder 88 by suitable screw members 126, the resistance units therein having appropriate leads 128 and 130 extending to a suitable source of electrical energy. Suitable controls may be provided to permit regulation of the amount of heat desired.

The injection piston 122 is reciprocated back and forth within the bore 100 of the injection cylinder 88 by means of a source of compressed air to the cylinder 132, air entering through the conduit 134 to move the piston forward and air entering the cylinder 130 through the conduit 136 to withdraw the injection piston.

Suitable T's 138 are provided in both of the air conduit lines 134 and 136 and conduits 140 and 142 may extend from the T's to the forward ends of the cylinders 130 and 120 respectively to effect the practically simultaneous withdrawal of the piston rods 118 and 122 respectively.

The cylinder 120 may be mounted upon a pivot pin 121, as shown, the pivot pin being positioned in a lug member 123 upon the forward face of the vertical back wall 12.

Suitable operating valves 160 and 162 are conveniently located preferably adjacent the front of the toggle frame 20 capable of operation by the operator in the following sequence: When it is desired to effect a molding operation and assuming that plastic granules have been poured in the hopper and have been pushed forward so that the injection cylinder 88 is charged with granules and the heating element 124 will have effected a partial melting of a portion of the same in the forward end of the cylinder, by operating the valve 160 air will be introduced in the upper end of the cylinder 38 whereby, through the toggle linkage shown and described, the upper platen carrying the section M² of the mold will be brought down and locked in sealed position against the lower section M¹ of the mold. In this position the valve 162 is now operated to permit the introduction of compressed air behind the piston 118 in the cylinder 120 and the injection piston 122 in the cylinder 130.

The first action of the air under pressure in cylinder 120 will be to move the injection cylinder 88 forward so that the end of the nozzle 92 engages the complementary opening 94 in the mold sections. This is accomplished by means of the link members 110 carrying the cylinder lock yoke 108 forward to bear against the end of the cylinder 88, the cylinder being guided in its forward movement by means of the guide pins 106 which extend into the openings 104 in the collar on the cylinder. The injection piston 122 now moves forward the required distance, forcing the practically fluid plastic in the forward end of the cylinder forward through the passageway 96 into the cavity C in the mold sections M¹ and M². Operation of the two-way valve 162 now causes the withdrawal of the injection piston 88 to its retarded or back position, as well as the withdrawal of the injection piston 122 to the position shown in Fig. 6 so that more plastic granules may be pressed into the chamber 100 of the injection cylinder 88. Operation of the two-way valve 160 now causes the air to enter the lower end of the cylinder 38 and raise the platen 36 through the toggle link assembly to the position shown in Fig. 2.

The molded objects may now be removed from the cavity C and placed in a cooling solution, the air valve 160 may be operated to close the molds, and the aforedescribed operation may be repeated.

From the above and foregoing it can be seen that I have provided a comparatively simple yet highly efficient apparatus for effective injection molding. Each molding operation in sequence consists of locking together the mold sections, bringing forward the injection cylinder nozzle into the inlet opening to the cavity in the molds, the extrusion of heated plastic into the cavity, and the withdrawal of the injection cylinder.

It should be borne in mind that the process which I have developed is considerably different from that used at the present time in plastic injection molding. It may be illustrated by the following comparison: Injection molding as done today on commercial machines moves the plastic into the mold in about 1/10 of a second at a pressure of some 30,000 to 60,000 pounds. Due to this slowness in action, it is necessary to have this tremendous force to force the plastic material into all the cracks and crevices at the extreme ends of the mold.

By my improved process the heating of the plastic reduces it to a low viscosity and when the nozzle of the injection cylinder is pressed against the passageway opening to the mold, pressure is applied on the plunger to force the molten or fluid plastic forward at an unusually high speed, the stroke taking perhaps 1/100 of a second. Due to this speed of operation and the viscosity of the plastic as it enters the mold, it has no time to harden or for the viscosity to go up, so that the molten plastic is actually "squirted" into all the corners and crevices of the mold. This is entirely due to the low viscosity of the plastic being used and the speed of injection which I employ.

Realizing that the plastic material commences cooling the instant it strikes the surfaces of the mold, it can readily be seen that when this high speed is used the remotest corners and crevices of the mold are reached practically instantaneously so that the platic material has no time in which to cool and increase in viscosity before it has reached all parts of the mold. If this speed of operation and the high fluidity of the plastic material is borne in mind, it can readily be seen that the method which I employ is considerably different from that at present employed and also highly advantageous thereover.

It can thus be seen that I have provided an improved process of plastic injection molding wherein by a comparatively low pressure per square inch and the heating to a high temperature of the plastic granules, a simplified plastic molding operation is accomplished. With the low pressures, high velocity and the high temperature employed, the molds may be made of aluminum, brass, or other comparatively soft material, thus reducing the cost of the molds considerably, and due to the low pressure at which the molding operation takes place, wear or breakage of the molds does not occur so that inexpensive molds can be used for a long time without becoming broken or out of order.

Due to the fluid condition of the plastic composition when introduced into the mold, intricate and fine objects may be molded by this process at a low cost and with an assurance that all the objects will be uniform and perfectly formed.

While I have illustrated and described a specific embodiment of the invention and the preferred way of carrying out the process therein described, it will be apparent to those skilled in the art that changes and modifications may be made in the exact details shown, and I do not wish to be limited in any particular; rather what I desire to secure and protect by Letters Patent of the United States is:

1. Apparatus for plastic injection molding comprising a base, a toggle frame unit positioned on the forward end of said base, said unit including parallel vertical T members, a bar affording a horizontal table connected therebetween above said base, a stationary mold section thereon, a second bar above said stationary mold section, a movable mold section secured to the lower side of the same, a linkage connected to the upper side of the same, an air cylinder mechanism for operating said linkage to move said second bar down to make and hold face contact between the movable and stationary mold sections, said mold sections when held together having an opening on one side of the same and a passageway extending from said opening to a cavity in said mold sections, an injection cylinder reciprocally positioned on said base, a tapered nozzle on one end of said cylinder aligned with said openings and adapted to engage the same during a molding operation, means for introducing plastic material into said cylinder, said means comprising an air cylinder actuated rod member, means associated with said cylinder for heating the same and means for moving said cylinder forward to permit its nozzle to engage said opening and simultaneously inject heated plastic material of a low viscosity through said opening into the cavity of said mold, said last named means including a yoke engaging the end of said cylinder to move the same forward, pins on said yoke, a pair of links pivoted at one end on said base and engaging said pins and an air cylinder mechanism connected to the other end of said links for actuating the same.

2. Apparatus for plastic injection molding comprising a base having a pair of mold sections thereon, said molds having a frusto-conically shaped opening on one side and a passageway extending from said opening to a cavity therein, an injection cylinder reciprocally positioned on said base, a tapered nozzle on one end of said cylinder aligned with said openings and adapted to engage the same during a molding operation, means for introducing plastic material into said cylinder, said means comprising an air cylinder actuated rod member, means associated with said cylinder for heating the same and means for moving said cylinder forward to permit its nozzle to engage said opening and simultaneously inject heated plastic material of a low viscosity through said opening into the cavity of said mold, said last named means including a yoke engaging the end of said cylinder to move the same forward, pins on said yoke, a pair of links pivoted at one end on said base and engaging said pins and an air cylinder mechanism connected to the other end of said links for actuating the same.

3. Apparatus for plastic injection molding comprising a base having a pair of separable mold sections thereon, the meeting faces of said mold sections having depressions therein which form a mold cavity when the mold sections are held together to form a mold, said mold sections having a frusto-conically shaped opening on one side and a passageway extending from said opening to said cavity, an injection cylinder reciprocally positioned on said base, a tapered nozzle on one end of said cylinder aligned with said opening and adapted to engage the same during a molding operation, a hopper for introducing plastic material into said cylinder, means for moving the same forward in said cylinder, said means comprising an air actuated piston reciprocal in said cylinder, means associated with said cylinder for heating a forward portion of the same and means for moving said cylinder forward to permit its nozzle to engage said opening while said piston moves heated plastic material through said opening into the cavity of said mold, said last named means including a yoke engaging the end of said cylinder to move the same forward, pins on said yoke, a pair of links pivoted at one end on said base and engaging said pins, and an air cylinder mechanism connected to the other end of said links for actuating the same.

4. Apparatus for plastic injection molding comprising a base having a pair of separable mold sections thereon, the meeting faces of said mold sections having depressions therein which form a mold cavity when the mold sections are held together to form a mold, said mold sections having a frusto-conically shaped opening on one side and a passageway extending from said opening to said cavity, an injection cylinder reciprocally positioned on said base, a tapered nozzle on one end of said cylinder aligned with said opening and adapted to engage the same during a molding operation, a hopper for introducing plastic material into said cylinder, means for moving the same forward in said cylinder, said means comprising an air actuated piston reciprocal in said cylinder, means associated with said cylinder for heating a forward portion of the same and means for moving said cylinder forward to permit its nozzle to engage said opening while said piston moves heated plastic material through said opening into the cavity of said mold, said last named means including a yoke engaging the end of said cylinder to move the same forward, pins on said yoke, a pair of links pivoted at one end on said base and engaging said pins, and an air cylinder mechanism connected to the other end of said links for actuating the same, said piston extending through said yoke whereby said cylinder and said piston move forward along the same center line.

5. Apparatus for plastic injection molding comprising a base, a toggle frame unit positioned on the forward end of said base, said unit including parallel vertical guide members, a horizontal table connected therebetween, a stationary mold section thereon, a reciprocal bar mounted above said stationary mold section between said guide members, a mold section secured to the lower side of the same, a linkage connected to the upper side of said reciprocal bar, an air cylinder mechanism for operating said linkage to move said bar down to make and hold face contact between the movable and stationary mold sections, said mold sections when held together forming a mold cavity therebetween, an opening on the side of said mold section, a passageway therein extending from said opening to the cavity in said mold sections, an injection cylinder reciprocally positioned on said base and aligned with said opening, a hopper for introducing plastic material into said cylinder, a piston for moving said material forward in said cylinder, means associated with the forward end of said cylinder and means for moving said cylinder forward to engage said opening while said piston moves heated plastic material through said opening into the cavity of said mold, said last named means including a pair of pivoted links, a yoke carried thereby and adapted to engage the end of said cylinder, and an air cylinder mechanism connected to the end of the links for actuating the same.

6. Apparatus for plastic injection molding comprising a base, a toggle frame unit positioned on the forward end of said base, said unit including parallel vertical guide means extending upwardly from said base, a brace member connected across the top of the same, a horizontal table on said base between said guide members, a stationary mold section thereon, a bar mounted for reciprocation above said stationary mold section and locked between said guide members, a mold section secured to the lower side of the same, a linkage connected to the upper side of said reciprocal bar, an air cylinder mechanism mounted on said brace member, said mechanism having a piston connected to said linkage to either move said bar down to make and hold face contact between the movable and stationary mold sections or to move said bar up to separate said mold sections, said linkage including a set of links on each side of said bar member, one connected to the bar member and one connected to the vertical guide members, and a pair of links connected between the lower end of said piston and each set of previously mentioned links, said links of such length that during a molding operation the side links are in vertical alignment and engage the guide members throughout their length and the piston links are horizontally extended in opposite directions, said mold sections when held together having an opening on one side of the same and a passageway extending from said opening to a cavity in said mold sections, a horizontally disposed injection cylinder reciprocally positioned on said base and aligned with said opening, means for introducing plastic material into said cylinder, means associated therewith for heating the same and means for moving said cylinder forward to engage said opening, and other means for simultaneously forcing heated plastic material through said opening into the cavity of said mold.

FRED A. GROTH.

REFERENCES CITED

The following references are of record in the file of this patent:

UNITED STATES PATENTS

| Number | Name | Date |
| --- | --- | --- |
| 2,182,400 | Husted | Dec. 5, 1939 |
| 2,199,144 | Tegarty | Apr. 30, 1940 |
| 2,246,414 | McIntyre | June 17, 1941 |
| 2,266,729 | Anderson | Dec. 23, 1941 |
| 2,293,304 | Muller et al. | Aug. 18, 1942 |
| 2,374,468 | Von Opel | Apr. 24, 1945 |
| 2,438,856 | Knowles | Mar. 30, 1948 |
| 2,479,433 | Tucker | Aug. 16, 1949 |